C. HERENDEEN.
METHOD OF TREATING FLOUR OR THE LIKE.
APPLICATION FILED APR. 16, 1914.
1,234,662.
Patented July 24, 1917.
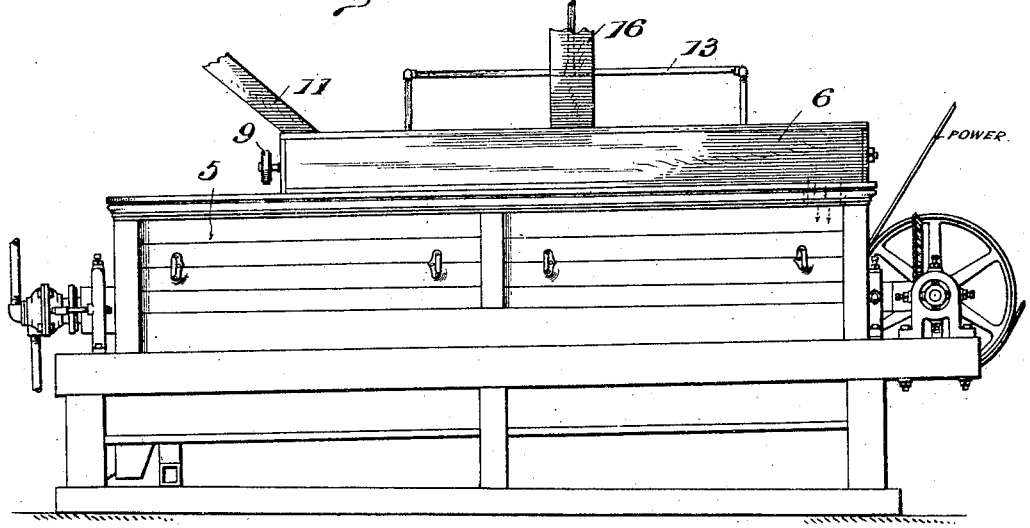
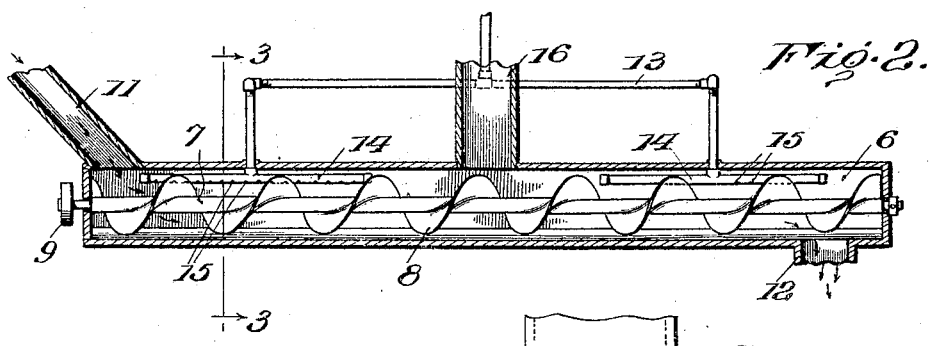
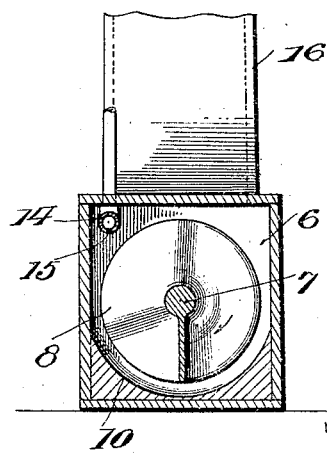
Inventor
Charles Herendeen
By Browne & Phelps
Attorneys
Witnesses

UNITED STATES PATENT OFFICE.

CHARLES HERENDEEN, OF CHICAGO, ILLINOIS.

METHOD OF TREATING FLOUR OR THE LIKE.

1,234,662.   Specification of Letters Patent.   Patented July 24, 1917.

Application filed April 16, 1914. Serial No. 832,309.

*To all whom it may concern:*

Be it known that I, CHARLES HERENDEEN, a citizen of the United States, residing at Chicago, in the county of Cook and State of Illinois, have invented certain new and useful Improvements in Methods of Treating Flour or the like, of which the following is a specification.

My invention relates to an improved method of treating flour or the like for the purpose of opening up the starch cells therein, which consists in moving the flour past a steam supply, causing the steam to impinge upon the moving flour and then drying the flour.

My invention further consists in certain steps which will be first described in connection with the accompanying drawing, wherein I show one form of machine capable of carrying out my process, and then the invention will be particularly pointed out in the appended claim.

Referring to the drawing wherein the same part is designated by the same reference numeral wherever it occurs, Figure 1 is a side elevation of a machine by which my invention may be carried out;

Fig. 2 is a central longitudinal section showing the flour feeding means and the steam supply and, Fig. 3 is a section taken on line 3, 3 of Fig. 2 and looking in the direction of the arrow.

5 designates any ordinary or desired form of flour or meal drier, and since the particular construction of this drier forms no part of my invention I have not deemed it necessary to show or describe the details of construction, or the particular operation of any specific form of such drier.

I have shown mounted on the top of this drier a casing 6, and 7 is a shaft extending longitudinally of the casing and journaled in the ends thereof, the shaft carrying a spiral flight or conveyer 8, and outside the casing at one end thereof a pulley 9, by which the shaft may be driven. The bottom of the casing 6 is shown on the inside as being formed into a curved section 10 to conform to the conveyer.

The diameter of the spiral is such that there is preferably a clearance between the periphery of the spiral and the casing, said clearance being preferably approximately about three quarters of an inch. 11 designates a hopper through which the flour to be treated is fed into the casing at one end thereof, and 12 a delivery spout adjacent the opposite end thereof from which the flour falls into the drier 5, the direction of rotation of the spiral being such as to cause the flour to be fed from the end of the casing into which the hopper 11 discharges to the end of the casing from which the delivery spout discharges. The action of the spiral conveyer in addition to feeding the flour along also acts to stir the same during the feeding operation, and to pile it up on one side of the casing at the bottom portion. In the form shown, wherein the conveyer is supposed to rotate clockwise when viewed as in Fig. 3, the flour will pile up on the left-hand side of the casing as viewed in this figure. In the upper part of the casing on the side on which the flour is piled up I provide a steam supply adapted to direct steam on to the piled-up mass of flour as it is passing through the casing under the action of the conveyer. In the form shown this steam supply consists of a supply pipe 13 connected to a pair of pipes 14, each of which has a row of perforations 15, the pipes extending parallel to the shaft of the conveyer, with their perforations arranged to shoot steam into the space between the side of the casing and the conveyer, and on to the piled up mass of flour being fed through the casing. As shown these pipes do not extend the full length of the casing, but there is a space in the center where flour will not be subjected to the action of steam. The result of this arrangement is that the flour when it first enters the casing is treated with steam and then it is given a rest and is then again treated with steam until it passes into the drier. 16 designates a pipe connected to the central portion of the casing and extending to any suitable exhaust device whereby the steam is removed from the casing.

In the operation of this machine flour is fed into the casing through the hopper 11, in a continuous stream, and it is picked up by the conveyer and carried forward. The action of the spiral conveyer is not only to feed the flour forward but to keep the mass agitated, so that all portions of the flour will be, during its passage through the casing, subjected to the action of steam. The flour when it reaches the opposite end of the casing passes out through the spout 12 into the drier 5, where it is immediately dried. I find that by this method of treating flour the starch cells are opened up, and that in treating flour, such as wheat flour, this is effected without destroying or injuring the gluten contained therein.

Having thus described my invention what I claim and desire to secure by Letters Patent is:

The method of treating flour or the like which consists in feeding the flour in a mass past a steam supply, agitating the mass while it is being fed causing the steam to impinge upon the mass while it is being agitated, then giving the flour a rest from the steam supply, then striking the mass of flour with additional steam while the mass is being agitated and then drying the flour.

In testimony whereof I affix my signature in presence of two witnesses.

CHARLES HERENDEEN.

Witnesses:
R. R. STEPHENSON,
LILLIAN PANKHURST.

Copies of this patent may be obtained for five cents each, by addressing the "Commissioner of Patents, Washington, D. C."